United States Patent
Schubert

(10) Patent No.: US 8,465,562 B2
(45) Date of Patent: Jun. 18, 2013

(54) SCALABLE BIOMASS REACTOR AND METHOD

(75) Inventor: Peter J. Schubert, Naperville, IL (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 444 days.

(21) Appl. No.: 12/760,241

(22) Filed: Apr. 14, 2010

(65) Prior Publication Data

US 2011/0094158 A1   Apr. 28, 2011

Related U.S. Application Data

(60) Provisional application No. 61/212,624, filed on Apr. 14, 2009.

(51) Int. Cl.
*B01J 7/00* (2006.01)
*C01B 3/36* (2006.01)

(52) U.S. Cl.
USPC ............................................. 48/61; 48/197 R

(58) Field of Classification Search
None
See application file for complete search history.

(56) References Cited

U.S. PATENT DOCUMENTS

| | | | |
|---|---|---|---|
| 4,968,325 A * | 11/1990 | Black et al. | 48/76 |
| 5,225,044 A * | 7/1993 | Breu | 202/113 |
| 5,354,127 A | 10/1994 | Del Zotto et al. | |
| 6,648,932 B1 | 11/2003 | Maton | |
| 2007/0214719 A1 | 9/2007 | Yoshikawa | |
| 2009/0022570 A1 * | 1/2009 | Craig et al. | 414/197 |
| 2009/0173005 A1 * | 7/2009 | Neumann | 48/86 R |
| 2010/0089295 A1 * | 4/2010 | Moench | 110/346 |

FOREIGN PATENT DOCUMENTS

KR   20040022642   3/2004

OTHER PUBLICATIONS

Ajay Kumar; Lijun Wang; Dennis A. Yuris; David A Jones; Milford A Hanna; Thermogravimetric Characterization of Corn Stover as Gasification/Pyrolysis Feedstock; American Society of Agricultural and Biological Engineers; 2007 ASABE Annual International Meeting; Paper No. 076146.

* cited by examiner

*Primary Examiner* — Imran Akram
(74) *Attorney, Agent, or Firm* — Hartman Global IP Law; Gary M. Hartman; Domenica N. S. Hartman

(57) ABSTRACT

A system and method capable of efficient production of synthesis gas from biomass materials in a manner which can be scaled to relatively large throughput capacities. the system is operable to compact a loose biomass material and simultaneously introduce the compacted biomass material into entrances of internal passages of multiple parallel reactors, heat the compacted biomass material within the reactors to a temperature at which organic molecules within the compacted biomass material break down to form ash and gases comprising carbon monoxide and hydrogen gases, inhibit combustion of the compacted biomass material when heated within the internal passages of the reactors, conduct the carbon monoxide and hydrogen gases through the reactors in a direction opposite the movement of the compacted biomass through the reactors, and remove the ash from the reactor.

9 Claims, 2 Drawing Sheets

SCALABLE BIOMASS REACTOR AND METHOD

CROSS REFERENCE TO RELATED APPLICATIONS

This application claims the benefit of U.S. Provisional Application No. 61/212,624, filed Apr. 14, 2009, and is related to U.S. Provisional Application No. 61/129,352, filed Jun. 20, 2008. The contents of these prior patent applications are incorporated herein by reference.

STATEMENT REGARDING FEDERALLY SPONSORED RESEARCH

This invention was made with government support under USDA Grant number 68-3A75-7-607. Under 37 CFR §401.14, the Government may have certain rights in the invention.

BACKGROUND OF THE INVENTION

The present invention generally relates to the conversion of organic lignocellulosic material (biomass) into a useful gas-phase fuel, and more particularly to a system and method capable of scalable and continuous conversion of biomass materials into useful gas-phase fuels.

Biomass gasification is a well-known process for producing synthesis gas (syngas), which as also known in the art is a gas mixture containing varying amounts of carbon monoxide (CO) and hydrogen gas ($H_2$). Though having a lower energy density than natural gas, syngas is suitable for use as a fuel source.

Within a biomass gasifier, a carbonaceous material typically undergoes pyrolysis, during which the carbonaceous material is heated to release volatiles and produce char. Combustion then occurs during which the volatiles and char react with oxygen to form carbon dioxide ($CO_2$) according to the reaction $$C + O_2 \rightarrow CO_2$$

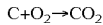

The next process is the gasification process, during which the char reacts with carbon dioxide and steam ($H_2O$) to produce carbon monoxide and hydrogen gas via the reaction $$C + H_2O \rightarrow H_2 + CO$$

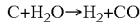

Consequently, the biomass gasification process employs oxygen or air to combust some of the biomass and produce carbon monoxide and energy, the latter of which is utilized to convert the remaining biomass to hydrogen and additional carbon monoxide.

Various types of gasifier designs are known. The most common type of gasifier used in biomass gasification is believed to be an up-draft design (counter-current) design, in which air, oxygen and/or steam flows upward through a permeable bed of biomass and counter-currently to the flow of ash and other byproducts of the reaction. Typical up-draft gasifiers have significant technical shortcomings. First, the introduction of air into the hot gasification chamber partly combusts the biomass, yielding a lower overall heating value compared to pure gasification. Second, if air is used as the gasification agent, nitrogen in the air is a diluent that reduces the energy content per unit volume of the output gas, making the output gas inconvenient for use in gas turbines, for storage, and for subsequent chemical processing. Third, tars and phenolic hydrocarbons produced in an up-draft gasifier require removal to reduce emissions, avoid fouling of a gas turbine, and avoid catalyst poisoning when used to create liquid fuels. The removal equipment adds to system complexity and size, with the result that for economic reasons the gasifier is usually limited to large installations. Because biomass is a low-energy content fuel and is dispersed geographically, a large-scale gasifier requires transport and storage of the biomass, which negatively affects the economic payback for the system.

If biomass gasification is performed at a sufficiently high temperature, all organic material can be broken down into simple molecules, such as carbon monoxide and hydrogen, and combustion byproducts can be avoided if the organic material is broken down predominantly through anaerobic pyrolysis. The latter is significant because it reduces toxic effluents and simplifies downstream syngas clean-up requirements. As noted above, it is also advantageous to minimize the introduction of air gases, since air is predominantly nitrogen. Achieving high temperatures efficiently without the introduction of air for partial combustion requires a system design which maximizes heat transfer, minimizes heat loss, and provides for continuous operation. These advantages have been realized for small scale systems (for example, up to 10 tons of biomass per day), as reported in U.S. patent application Ser. No. 12/357,788, whose contents are incorporated herein by reference. However, it would be desirable if such advantages could also be realized with a system and process that are scalable to systems that are larger by at least two orders of magnitude, for example, about 1000 to 10,000 tons/day.

BRIEF DESCRIPTION OF INVENTION

The present invention provides a system and method capable of efficient production of synthesis gas from biomass materials in a manner which can be scaled to relatively large throughput capacities.

According to a first aspect of the invention, the system includes multiple parallel reactors each defining an internal passage, and means for compacting a loose biomass material and simultaneously introducing the compacted biomass material into entrances of the internal passages of the reactors. The system further includes means for heating the compacted biomass material within the reactors to a temperature at which organic molecules within the compacted biomass material break down to form ash and gases comprising carbon monoxide and hydrogen gases, means for inhibiting combustion of the compacted biomass material when heated by the heating means within the internal passages of the reactors, gas passages within the internal passages of the reactors for conducting the carbon monoxide and hydrogen gases through the reactors in a direction opposite the movement of the compacted biomass through the reactors, and means for removing the ash from the reactor.

According to a second aspect of the invention, the method includes compacting a loose biomass material and simultaneously introducing the compacted biomass material into entrances of internal passages of multiple parallel reactors, heating the compacted biomass material within the reactors to a temperature at which organic molecules within the compacted biomass material break down to form ash and gases comprising carbon monoxide and hydrogen gases, inhibiting combustion of the compacted biomass material when heated by the heating means within the internal passages of the reactors, conducting the carbon monoxide and hydrogen gases through the reactors in a direction opposite the movement of the compacted biomass through the reactors, and removing the ash from the reactor.

Other aspects and advantages of this invention will be better appreciated from the following detailed description.

DETAILED DESCRIPTION OF INVENTION

Figure 1:
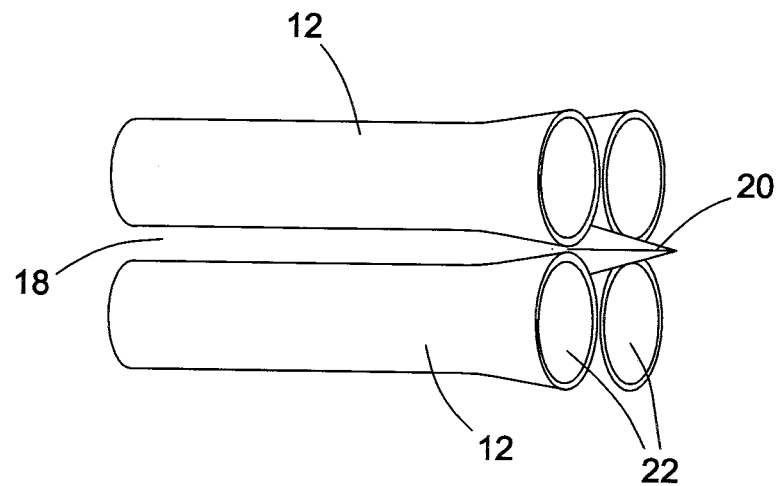
FIG. 1 represents a perspective view of an array of reactor tubes according to an embodiment of this invention.
Figure 2:
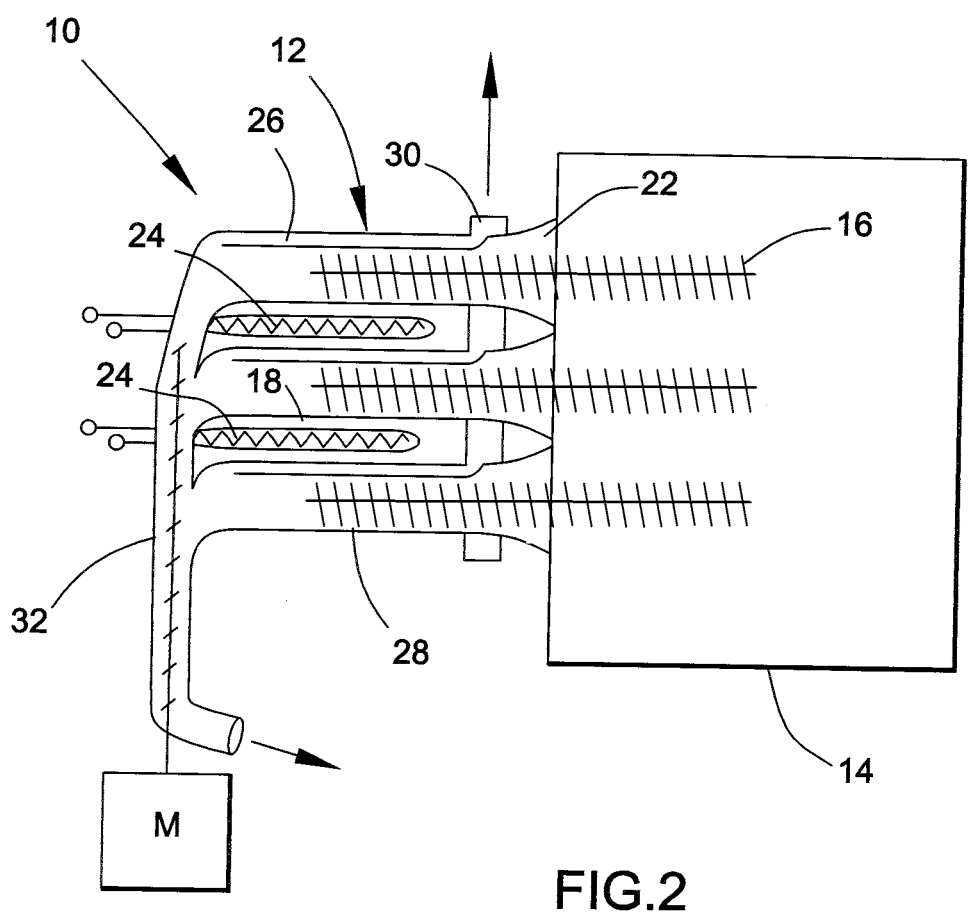
FIG. 2 represents a cross-sectional view of an array of reactor tubes similar to that shown in FIG. 1, but showing the tubes coupled to a feed hopper and to syngas and ash removal passages according to an embodiment of this invention.

FIGS. 1 and 2 represent basic concepts relating to a scalable biomass gasifier system in accordance with preferred aspects of the invention. FIG. 1 represents four parallel reactor tubes 12 of a scalable biomass gasifier system 10 represented in FIG. 2. The reactor tubes 12 serve as the containment vessel in which the gasification process occurs, producing syngas as a desired product and dry ash as a byproduct. In FIGS. 1 and 2 further represent the tubes 12 configured in an array (linear, planar, or convex surface), into which biomass particles (not shown) are delivered from a bulk hopper 14 via any suitable type of feeder device 16, represented in FIG. 2 as an auger though other methods of delivery are also within the scope of the invention, such as through the use of a ram or by gravity feed. The reactor tubes 12 are packed together so that incoming biomass does not enter the interstices 18 between adjacent tubes 12. For example, a deflector 20 is represented in FIG. 1 as being located within the interstice 18 at the throats 22 of the tubes 12 to serve as a guide for incoming biomass and prevent biomass from entering the interstice 18.

As evident from FIG. 2, the array of reactor tubes 12 are arranged so that their throats 22 lie on a common two-dimensional (2-D) surface (either Euclidian or Riemann). The arrangement of the reactor tubes 12 may be on a rectilinear grid, or may be in a close-packed configuration, or other geometric arrangement as may be necessary for coupling with the biomass hopper 14. Though shown as round, the throats 22 of the tubes 12 may have a rectilinear cross-section. The throats 22 are further represented as having a flared shape, which is advantageous to minimize backflow of syngas through the tubes by promoting compaction of the biomass as it enters the tubes 12, as well as to allow for the creation of the interstices 18 between the individual reactor tubes 12 to accommodate heating elements 24. The heating elements 24 can be of a variety of types, including but not limited to resistance heaters, radiant heaters including heat lamps, plasma heaters and electromagnetic heaters. The heating elements 24 are preferably arranged within the interstices 18 and optionally surrounding the outermost tubes 12 of the array so that the tubes 12, and particularly the heated zones 28 located near the midsections of the tubes 12, capture substantially all of the heat energy generated by the elements 24 and the overall temperature of the entire array is as uniform as possible across surfaces parallel to the common 2-D surface of the array. Though the array of tubes 12 are represented in FIGS. 1 and 2 as horizontally oriented, the tubes 12 can be oriented at various angles with respect to each other and with respect to gravity (vertical).

FIG. 2 further shows the reactor tubes 12 fitted with gas lines 26 that gather syngas near the end of each tube 12 farthest from the throats 22 where the biomass entered the tubes 12. Each gas line 26 is shown as being routed back through the heated zones 28 of the tubes 12 so that any heavy hydrocarbon molecules in the syngas can be cracked into smaller molecules (such as carbon monoxide and hydrogen) by the additional heating achieved with the heating elements 24. The resulting syngas is then drawn from these gas lines 26, such as with blowers (not shown), and collected in an outlet passage 30, after which the syngas may be passed through a particulate filter before being delivered to a holding tank, downstream process, prime mover, fuel cell, or any other suitable destination. Steam may be injected into the tubes 12 to assist in the conversion of char to syngas via the known water-gas shift reaction. The continuous supply of biomass to the tubes 12 pushes the dry ash byproduct of the reaction through the tube 12 and into a manifold 32, which can employ gravity and/or other conveying means (such as the auger represented in FIG. 2) to remove the ash from the system 10. The tubes 12 may be optionally sealed to prevent backflow of syngases toward the tube throats 22, as well as to allow for maintenance. Ports within the reactor tubes 12 that serve as entrances to the gas lines 26 are preferably oriented and located outside the heated zones 18 to reduce the likelihood that biomass material will enter the gas lines 26.

The diameters of the reactor tubes 12 are preferably selected such that the heating elements 24 are as nearly as possible able to uniformly heat the biomass material across the cross-section of the tubes 12 and within the time period required for the biomass material to travel through the tubes 12 and become pyrolized. Thus, the lengths and diameters of the reactor tubes 12 are interdependent based on this common concept.

The biomass conveyed from the hopper 14 into the open throats 22 of the reactor tube 12 is preferably size-reduced, as is typically the case for corn stover, wood chips, gin trash, dry distillers grain solids, and mess hall organic waste. The particle size of the biomass material is preferably limited to about one-sixth of the diameters of the reactor tubes 12. The hopper 14 is shown in FIG. 2 as being in intimate contact with the flared ends at the throat 22 of each tube 12 within the tube array, such that the common 2-D surface defined by the array is either a boundary of the hopper 14 or protrudes into the hopper 14. It is advantageous that the amount of biomass material in the hopper 14 be maintained at a sufficient level to ensure that there is always biomass available to every reactor tube 12 in the array, such that backflow of syngas is minimized. The biomass within the hopper 14 may be stirred to maintain the material at a uniform height within the hopper 14, especially if the common 2-D surface of the tube array is substantially normal to the earth's surface. Alternatively, it is foreseeable that the reactor tubes 12 could be vertically oriented and the common 2-D surface of the tube array arranged and configured to form the bottom of the hopper 14, allowing the biomass material to be conveyed downward by gravity and/or other conveying means to the reactor tube throats 22.

As previously noted, a preferred aspect of the invention is to maintain the tubes 12 with what is essentially a plug of biomass material, preferably located within the throat 22 of each reactor tube 12 to inhibit backflow of syngas through the tubes 12. Plugging the tubes 12 with the biomass also serves to better contain the heat within the reactor tubes 12 to promote the gasification reaction and reduce the risk of a fire in the hopper 14. The degree to which the tube throats 22 are tapered, the degree to which the feeder devices 16 are capable of packing the biomass material into the throats 22, and the distance of the feeder devices 16 from the openings of the throats 22 will all affect the axial length and density of the biomass plug within the tubes 12. It can be appreciated that there may be more than one combination of these three factors which provide the desired or optimal performance in a given configuration. To address the contingency that an individual tube 12 becomes starved of biomass material, the tubes 12 may be equipped with means (not shown) for closing individual tubes 12. Such closing means may include, but is not limited to, driving the corresponding feeder device 16 into the throat 22 of the starved tube 12 to promote a better seal, provide a knife valve at or near the throat 22 to seal a starved tube 12, and/or closing a valve (not shown) through which syngas is drawn from the starved tube 12. Each of these closing means, individually or in combination, may be employed to minimize the risk of fire, minimize back-diffusion of the desired syngas product, and minimize heat loss to promote process efficiency and reduced hazard risks.

Further features of the system 10 and of the tubes 12 of the system 10 are discussed below, some of which are similar to or derived from certain process and design parameters reported in U.S. patent application Ser. No. 12/357,788.

The temperature of pyrolysis employed by this invention can vary, but preferably ranges from about 850 to about 1150° C. Within the reactor tubes 12, there is preferably a temperature profile which most effectively converts the solid biomass into syngas. This profile may entail the creation of a two- or three-zone heater arrangement where, for example, biomass encounters a first heating zone after it enters the tube 12 where the biomass is heated to nearly its volatilization temperature (typically around 350° C.), then enters a second heating zone where its temperature is quickly ramped up to the full pyrolysis temperature to effect a rapid cracking of molecules before they can form heavy or toxic compounds. In an optional third heating zone, the temperature is lower than the second zone so that mineral ash remaining after pyrolysis will not form low-melting point glasses that may not flow readily through the reactor tubes 12.

If the primary axes of the reactor tubes 12 are horizontal, it may be advantageous for the axes to tilt downward toward the ends of the tubes 12 opposite their throats 22. The purpose of this slope is to encourage any gasses, rolling debris, or packed ash to be conveyed to the ash manifold 32 coupled to the ends of the reaction tubes 12. If the primary axes of the reactor tubes 12 are essentially vertical, it may be advantageous to provide the tubes 12 with one or more spikes (not shown) that project into the interiors of the tubes 12 so that biomass material falling into the tubes 12 impinges the spikes to break up any large biomass chunks as well as impede the flow of biomass material through the tubes 12 and thereby increase the residence time of the biomass material within the hottest (second) zones of the tubes 12. In addition, a grate (not shown) can be located at or near the base of each spike to assure that little or no biomass material falls entirely through the reactor tube 12 without becoming gasified.

Figure 3:
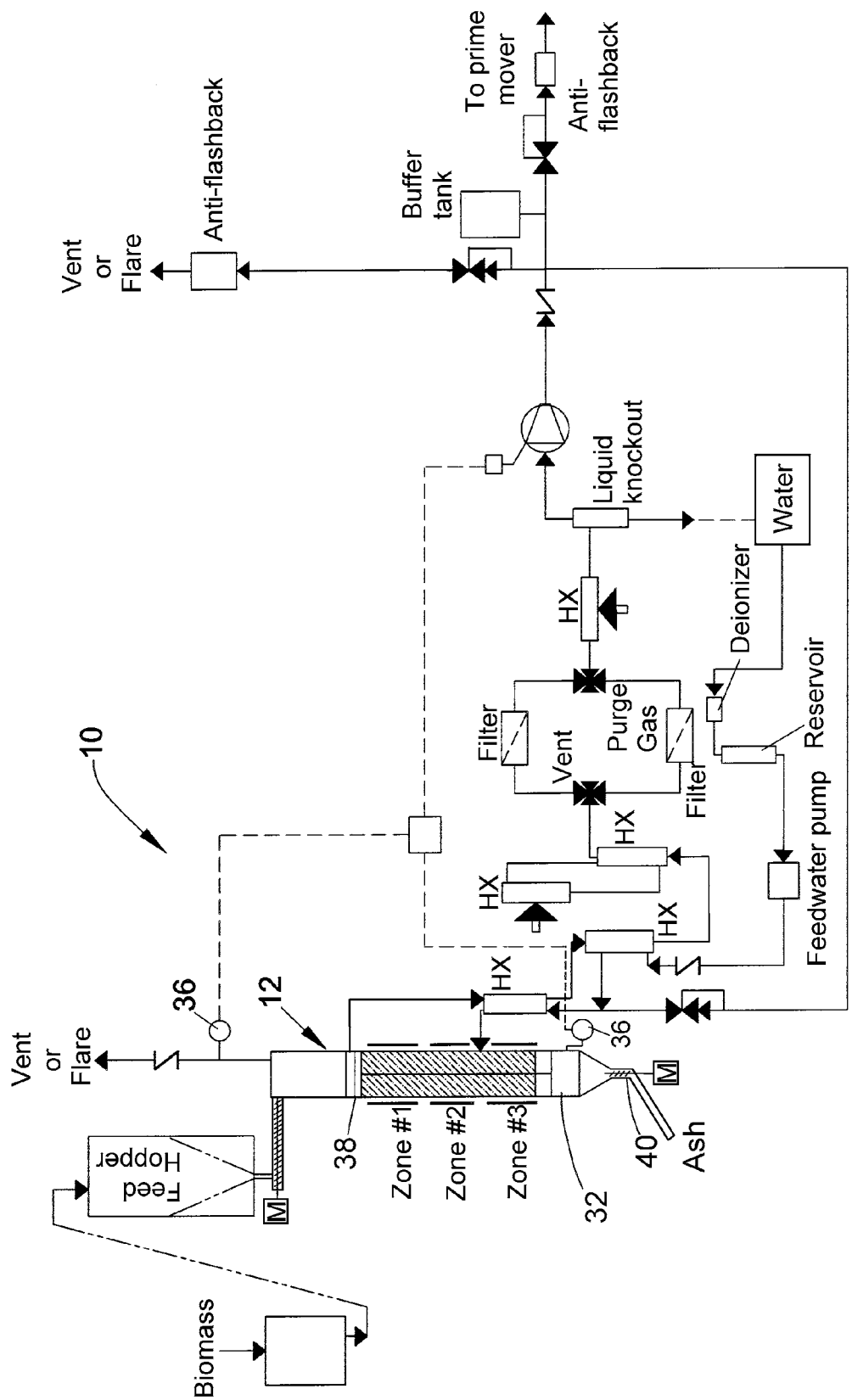
FIG. 3 is a schematic of a biomass reactor incorporating a neutral atmospheric pressure capability in accordance with another aspect of this invention.

To minimize energy input and equipment complexity, the system 10 can be configured to have a neutral atmospheric pressure reactor configuration, such as represented in FIG. 3. Such a configuration can be accomplished by utilizing highly sensitive differential pressure sensors 36 at the reactor inlet and/or the ash removal section of the system to monitor and adjust the volumetric rate of gaseous discharge via a blower or vacuum pump used to draw the syngas from the gas lines 26 into the passage 30. In this manner, the aforementioned plug of biomass material forms a seal at the inlet section 38 of the array of tubes 12, while also an ash removal system 40 located downstream of the manifold 32 promotes the formation of an ash plug to effectuate a seal within the manifold 32. This can be done by having a section of pipe where the transport mechanism (piston, auger, etc.) through the manifold 32 is absent and the ash is forced through this portion thus compacting the ash slightly. An alternative is to taper the manifold 32 to force or compact the ash similarly to an extrusion process. The integrity of the seal at a given pressure is a function of leakage rate due to the porosity/composition of the biomass or ash plug. The porosity of the plug can be adjusted by the degree of compaction of the material being transported. This capability is particularly desirable from the stand point of eliminating the need for a lock hopper system to mitigate the ingress of air into the reactor tubes 12 or unwanted leakage of syngas from the ash removal section 40 by ensuring that the system 10 operates within inlet and outlet pressures within certain limits. As should be understood, particularly in view of the foregoing discussion, the ingress of air into the reactor tubes 12 would have an unwanted diluent effect on the syngas produced, thus reducing its heating value and leading to an overall net energy efficiency decrease, while leakage of syngas from the process would introduce potentially significant safety issues and have a net overall decrease in net energy efficiency, especially if the leakage is such as to reduce the energy production capabilities of the system.

A closed-loop control system (not shown), with suitable parameters (such as a PID controller or another known to those skilled in these art) may be used to introduce a controlled amount of water or water vapor (including steam) based on properties of the syngas. These properties may include, but are not limited to, the moisture content of the syngas, the amount of liquid condensed out in a condenser, the conductivity of the gas, or other means known to those skilled in the art. There are also means by which the output gas properties, such as pressure or temperature, can be used in a chemical and/or mechanical system to regulate the amount of water introduced. Introduction of the water may be accomplished in many ways, including but not limited to injection, osmosis, control valve, diffusion, or wicking/capillary action.

Waste heat generated from the heating elements 24 and lost from the tubes 12 may be harvested and used for a variety of purposes. The gas effluent may also be run through a heat exchanger, heat pipe, or other means of heat transfer to provide heat which can be used to advantage in the overall method. The waste heat can be conveyed in many ways, including but not limited to a working fluid, a heat pipe (single-phase or two-phase), a conductive media such as metal or diamond, by radiation, or by convection of a suitable working fluid. The harvested waste heat may be used, as nonlimiting examples, to dry incoming biomass, heat of the reactor tubes 12, and heat devices used to remove liquid and/or solid residues from the system. Waste heat may also be harvested in more useful forms, such as for the purpose of running a Stirling engine for mechanical work, operating a thermoelectric cooler (Peltier effect) for electrical power, or used outside the system 10 for essentially any desired purpose.

Waste heat, including exhaust gasses from a prime mover or SOFC, can be particularly useful for drying a biomass material that has a high moisture content. Injection of hot, dry air into the hopper 14 could be used for this purpose to obtain several benefits, including driving-off excess moisture in the biomass material and separating or fluffing the biomass material to avoid bridging or rat-holing.

While the invention has been described in terms of a specific embodiments, it is apparent that other forms could be adopted by one skilled in the art. For example, the physical configuration of the system 10 and its components could differ from that shown, and materials and processes other than those noted could be used. Therefore, the scope of the invention is to be limited only by the following claims.

The invention claimed is:

1. A system for producing syngas from biomass materials, the system comprising:
   multiple parallel reactors configured in an array, each of the reactors defining an internal passage, each of the internal passages defining an entrance to the reactor thereof, the array being arranged so that the entrances of the reactors lie on a common two-dimensional surface, the reactors and the internal passages thereof being adapted to contain a compacted biomass material moving in parallel directions from the entrances of the reactors and through the internal passages thereof and to contain a reaction of the compacted biomass material by which gases are formed therefrom within the reactors;
   feeder devices extending through each of the entrances of the reactors and into each of the internal passages of the reactors, the feeder devices being operable to deliver a loose biomass material to each of the reactors, compact the loose biomass material within the internal passage of each of the reactors, and form from the loose biomass material the compacted biomass within the internal passages of the reactors;
   a hopper configured to contain the loose biomass material and from which the loose biomass material is delivered by the feeder devices to each of the reactors;
   means for heating the compacted biomass material within the reactors to a volatilization temperature at which organic molecules within the compacted biomass material break down to form ash and the gases formed therefrom, the gases comprising carbon monoxide and hydrogen gases;
   means for inhibiting dilution and combustion of the compacted biomass material when heated by the heating means within the internal passages of the reactors by inhibiting ingress of air into each of the internal passages of the reactors through the entrances thereof, the inhibiting means comprising the feeder devices and the compacted biomass material within the internal passages of the reactors;
   gas passages having ports that gather the carbon monoxide and hydrogen gases within the internal passages of the reactors, the gas passages for conducting the carbon monoxide and hydrogen gases from each of the reactors; and
   means for removing the ash from the reactor.

2. The system according to claim 1, wherein the reactors are neutral atmospheric pressure reactors.

3. The system according to claim 1, wherein within each of the reactors there exists a temperature profile comprising a first heating zone where the compacted biomass material is heated to a temperature approaching the volatilization temperature of the compacted biomass material and a subsequent second heating zone where the compacted biomass material is heated to at least the volatilization temperature.

4. The system according to claim 1, the system further comprising means for individually closing the reactors in an event that an individual reactor of the reactors becomes starved of the loose biomass material.

5. A process comprising operating the system of claim 1 to produce syngas from biomass materials.

6. A process of producing syngas from biomass materials, the process comprising:
   simultaneously introducing a loose biomass material into internal passages of each of multiple parallel reactors configured in an array, each of the internal passages defining an entrance to the reactor thereof, the array being arranged so that the entrances of the reactors lie on a common two-dimensional surface, the loose biomass material being introduced into the internal passages with feeder devices that extend through the entrances and into the internal passages of each of the reactors;
   compacting the loose biomass material within the internal passage of each of the reactors and forming therefrom a compacted biomass within the internal passages of the reactors so that the compacted biomass material moves in parallel directions from the entrances of the reactors and through the internal passages thereof;
   heating the compacted biomass material within the reactors to a volatilization temperature at which a reaction of the compacted biomass material occurs by which organic molecules within the compacted biomass material break down to form ash and gases comprising carbon monoxide and hydrogen gases, the reactors and the internal passages thereof containing the compacted biomass material moving in the parallel directions through the internal passages and containing the reaction of the compacted biomass material;
   inhibiting dilution and combustion of the compacted biomass material when heated by the heating means within the internal passages of the reactors by inhibiting ingress of air into each of the internal passages of the reactors through the entrances thereof, the inhibiting means comprising the feeder devices and the compacted biomass material within the internal passages of the reactors;
   conducting the carbon monoxide and hydrogen gases through gas passages having ports that gather the carbon monoxide and hydrogen gases within the internal passages of the reactors, the gas passages conducting the carbon monoxide and hydrogen gases from each of the reactors; and
   removing the ash from the reactor.

7. The process according to claim 6, wherein a neutral atmospheric pressure exists within the reactors.

8. The process according to claim 6, wherein within each of the reactors there exists a temperature profile comprising a first heating zone where the compacted biomass material is heated to a temperature approaching the volatilization temperature of the compacted biomass material and a subsequent second heating zone where the compacted biomass material is heated to at least the volatilization temperature.

9. The system according to claim 6, the process further comprising individually closing the reactors in an event that an individual reactor of the reactors becomes starved of the loose biomass material.

* * * * *